US010711648B2

(12) United States Patent
Maliniak

(10) Patent No.: US 10,711,648 B2
(45) Date of Patent: Jul. 14, 2020

(54) NOSECONE SUPPORT

(71) Applicant: United Technologies Corporation, Hartford, CT (US)

(72) Inventor: David Maliniak, Middletown, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 668 days.

(21) Appl. No.: 14/774,379

(22) PCT Filed: Feb. 19, 2014

(86) PCT No.: PCT/US2014/017068
§ 371 (c)(1),
(2) Date: Sep. 10, 2015

(87) PCT Pub. No.: WO2014/186018
PCT Pub. Date: Nov. 20, 2014

(65) Prior Publication Data
US 2016/0024972 A1 Jan. 28, 2016

Related U.S. Application Data

(60) Provisional application No. 61/882,751, filed on Sep. 26, 2013, provisional application No. 61/778,783, filed on Mar. 13, 2013.

(51) Int. Cl.
F01D 25/28 (2006.01)
F02C 7/04 (2006.01)
(Continued)

(52) U.S. Cl.
CPC ............... *F01D 25/28* (2013.01); *F01D 5/02* (2013.01); *F01D 9/04* (2013.01); *F01D 9/041* (2013.01);
(Continued)

(58) Field of Classification Search
CPC . F01D 25/24; F01D 25/28; F01D 5/02; F01D 9/04; F01D 9/041; F04D 2220/32;
(Continued)

(56) References Cited

U.S. PATENT DOCUMENTS 2,516,819 A 7/1950 Whittle
2,594,118 A 4/1952 Boyd
(Continued)

FOREIGN PATENT DOCUMENTS

GB 637598 5/1950
GB 2205360 12/1988

OTHER PUBLICATIONS

Supplementary European Search Report for Application No. 14797272.3 dated Dec. 20, 2016.
(Continued)

Primary Examiner — Mark A Laurenzi
Assistant Examiner — Dapinder Singh
(74) Attorney, Agent, or Firm — Carlson, Gaskey & Olds, P.C.

(57) ABSTRACT

A example nosecone support of a gas turbine engine includes, among other things, a spar to extend radially from a nosecone. The spar is configured to attach to a case to support the nosecone.

22 Claims, 3 Drawing Sheets

(51) Int. Cl.
*F02K 3/04* (2006.01)
*F01D 9/04* (2006.01)
*F01D 5/02* (2006.01)
*F01D 25/24* (2006.01)

(52) U.S. Cl.
CPC .............. *F01D 25/24* (2013.01); *F02C 7/04* (2013.01); *F02K 3/04* (2013.01); *F05D 2220/32* (2013.01); *F05D 2220/36* (2013.01); *F05D 2230/60* (2013.01)

(58) Field of Classification Search
CPC .... F04D 2220/36; F05D 2230/60; F02C 7/04; F02K 3/04
USPC ........................................................ 415/191
See application file for complete search history.

(56) References Cited

U.S. PATENT DOCUMENTS

| | | | |
|---|---|---|---|
| 2,631,425 A | 3/1953 | Kurt | |
| 2,927,725 A * | 3/1960 | Rainbow | F01D 17/162 415/115 |
| 4,585,391 A * | 4/1986 | Vuillet | B64C 27/82 415/121.3 |
| 5,573,378 A | 11/1996 | Barcza | |
| 6,447,255 B1 | 9/2002 | Bagnall et al. | |
| 6,807,803 B2 * | 10/2004 | Poccia | F02K 1/822 60/39.5 |
| 7,950,899 B2 * | 5/2011 | Euvino, Jr. | F01D 5/147 415/200 |
| 8,292,592 B2 | 10/2012 | Welch et al. | |
| 8,366,047 B2 * | 2/2013 | Euvino, Jr. | F01D 25/02 244/134 D |
| 9,644,497 B2 * | 5/2017 | Salunkhe | F01D 25/30 |
| 2008/0279688 A1 | 11/2008 | Jensen et al. | |
| 2009/0014609 A1 | 1/2009 | Urac et al. | |
| 2009/0214354 A1 | 8/2009 | Bagnall | |
| 2009/0297334 A1 | 12/2009 | Norris et al. | |
| 2010/0215507 A1 | 8/2010 | Breakwell | |
| 2010/0226786 A1 | 9/2010 | Mahan | |
| 2011/0223008 A1 | 9/2011 | Belmonte et al. | |
| 2011/0236217 A1 | 9/2011 | Bottome | |
| 2012/0288366 A1 | 11/2012 | Merry et al. | |

OTHER PUBLICATIONS

International Preliminary Report on Patentability for PCT Application No. PCT/US2014/017068, dated Sep. 24, 2015.
International Search Report for International Application No. PCT/US2014/017068 dated Dec. 9, 2014.

* cited by examiner

NOSECONE SUPPORT

BACKGROUND

Turbomachines typically include a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor section.

Turbomachines used primarily for propulsion, such as aircraft engines, can include a fan section driven by a low spool such that a low pressure compressor, a low pressure turbine, and the fan section rotate at a common speed in a common direction. A speed reduction device such as an epicyclical gear assembly may be utilized to drive the fan section such that the fan section may rotate at a speed different than the turbine section so as to increase the overall propulsive efficiency of the engine. Turbomachines used primarily for power generation, such as industrial gas turbine engine generators do not include a fan section.

Both gas turbine engines used for propulsion and gas turbine engines used for power generation include nosecones that guide air into the engine. Supporting the nosecones is often difficult due, in part, to the position of the nosecone within the gas turbine engine. Prior art nosecones are typically supported exclusively by a radially inner ring.

SUMMARY

A nosecone support of a gas turbine engine according to an exemplary aspect of the present disclosure includes, among other things, a spar to extend radially from a nosecone. The spar is configured to attach to a case to support the nosecone.

In another example of the foregoing nosecone support, the spar extends radially across a flowpath of a gas turbine engine.

In another example of any of the foregoing nosecone supports, the spar includes a first end for directly securing to the nosecone and an opposing second end for securement to a compressor case.

In another example of any of the foregoing nosecone supports, a fastener tab extends from the first end, the fastener tab for securement to an axially facing surface of the compressor case.

In another example of any of the foregoing nosecone supports, the compressor case is a low pressure compressor case.

In another example of any of the foregoing nosecone supports, the gas turbine engine is a land-based gas turbine engine.

In another example of any of the foregoing nosecone supports, the spar is integral with the nosecone.

In another example of any of the foregoing nosecone supports, the spar is configured to be positioned directly upstream an inlet guide vane of a compressor, and to be circumferentially aligned with the inlet guide vane.

In another example of any of the foregoing nosecone supports, the spar is one of a plurality of spars, and the nosecone is supported exclusively by the plurality of spars.

A nosecone assembly according to yet another exemplary aspect of the present disclosure includes, among other things, a nosecone, and a plurality of spars extending radially directly from the nosecone, the plurality of spars configured to attach to a case of a gas turbine engine.

In another example of the foregoing nosecone assembly, the case is a low pressure compressor case.

In another example of any of the foregoing nosecone assemblies, the gas turbine engine is a land-based gas turbine engine.

In another example of any of the foregoing nosecone assemblies, the spar extends radially across a flowpath of a gas turbine engine.

In another example of any of the foregoing nosecone assemblies, the spar includes a first end for securing to the nosecone and an opposing second end for securement to a compressor case.

In another example of any of the foregoing nosecone assemblies, the nosecone and the plurality of spars form portions of a single unitized structure.

In another example of any of the foregoing nosecone assemblies, a gas turbine engine having the nosecone assembly includes a nacelle secured to the case.

A method of supporting a nosecone according to yet another exemplary aspect of the present disclosure includes, among other things, securing a plurality of spars to a case of a gas turbine engine, the plurality of spars extending radially from a nosecone.

In another example of the foregoing method, the case is a compressor case.

In another example of any of the foregoing methods, the method includes supporting the nosecone exclusively with the spars.

DETAILED DESCRIPTION

Figure 1:
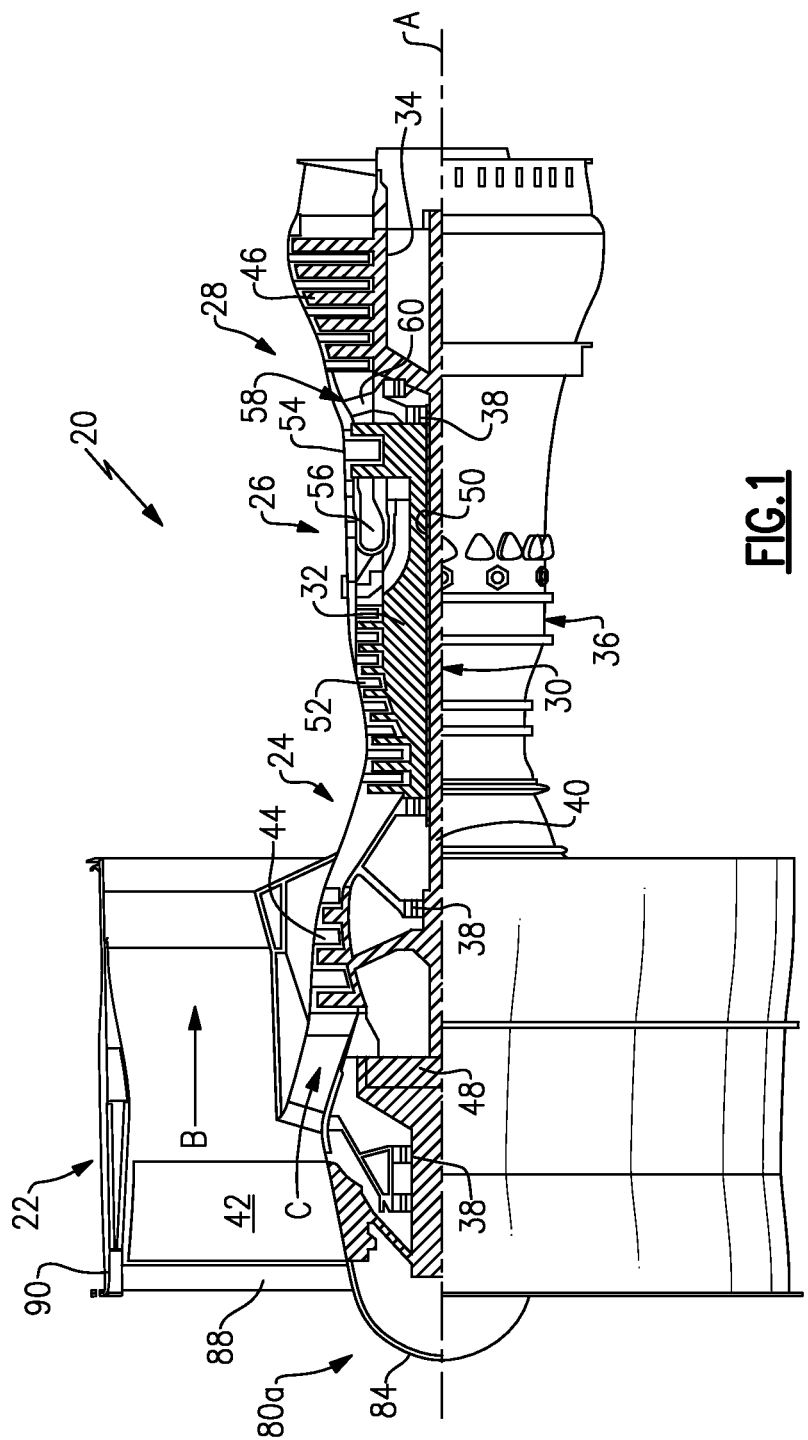
FIG. 1 schematically illustrates an example gas turbine engine.

FIG. 1 schematically illustrates an example gas turbine engine 20 that includes a fan section 22, a compressor section 24, a combustor section 26, and a turbine section 28. Alternative engines might include an augmenter section (not shown) among other systems or features. The fan section 22 drives air along a bypass flowpath B while the compressor section 24 draws air in along a core flowpath C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflowpath and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6:1), with an example embodiment being greater than about ten (10:1). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')" is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment, the low fan pressure ratio is less than about 1.45.

"Low corrected fan tip speed" is the actual fan tip speed in ft/sec divided by an industry standard temperature correction of $[(Tram\ °R)/(518.7°\ R)]^{0.5}$. The "Low corrected fan tip speed," as disclosed herein according to one non-limiting embodiment, is less than about 1150 ft/second.

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment, the low pressure turbine 46 includes about three (3) turbine rotors. A ratio between the number of fan blades and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades in the fan section 22 disclose an example gas turbine engine 20 with increased power transfer efficiency.

Figure 2:
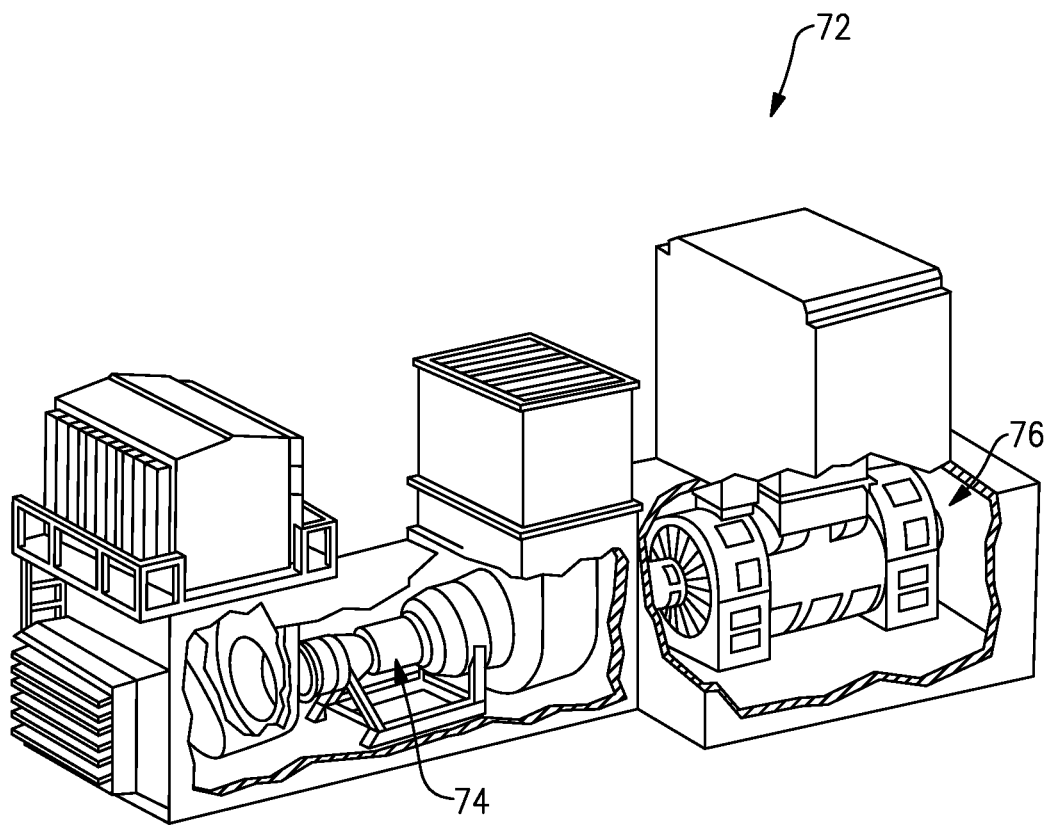
FIG. 2 schematically illustrates another example gas turbine engine.

Referring now to FIG. 2, an example industrial gas turbine engine assembly 72 includes a gas turbine engine 74 that is mounted to a structural land-based frame to drive a generator 76. The example gas turbine engine 74 includes many of the same features described in the gas turbine engine 20 illustrated in FIG. 1 and operates in much the same way. The land-based industrial gas turbine engine 74, however, may include additional features such as a shaft to drive the generator 76 and is not constrained by the same weight restrictions that apply to an aircraft mounted gas turbine engine 20. In addition, the example gas turbine engine 74 does not include a fan.

As appreciated, many of the parts that are utilized in an aircraft and land-based gas turbine engine are common and therefore both aircraft-based and land-based gas turbine engines are within the contemplation of this disclosure.

Figure 4:
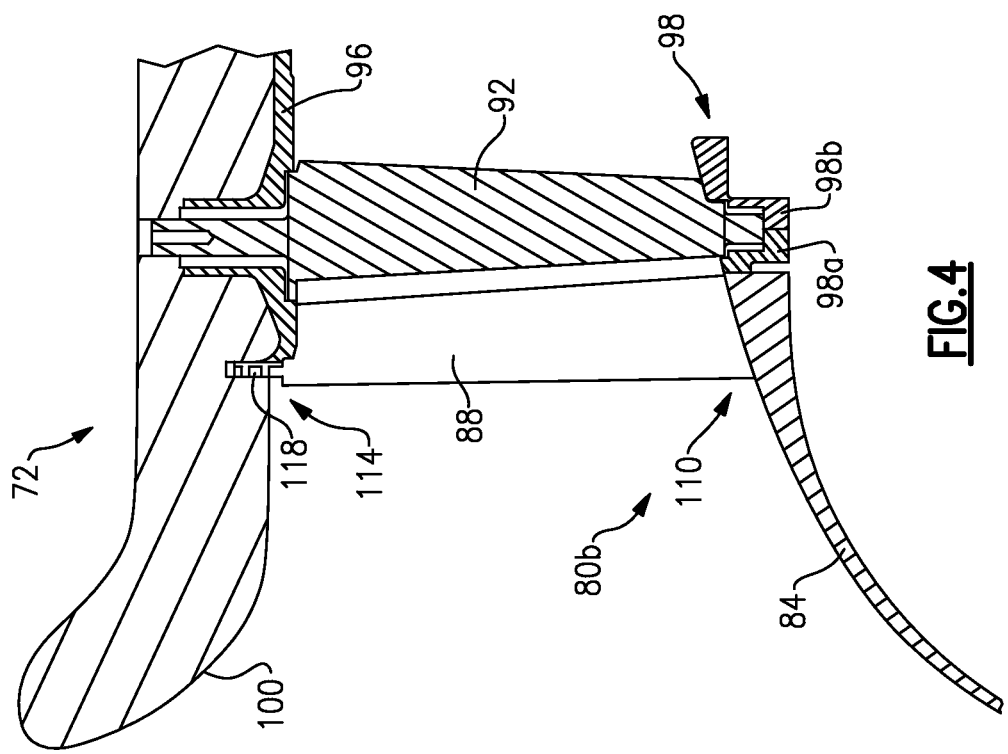
FIG. 4 is a section view of a spar in the low pressure compressor section of FIG. 2.
Figure 3:
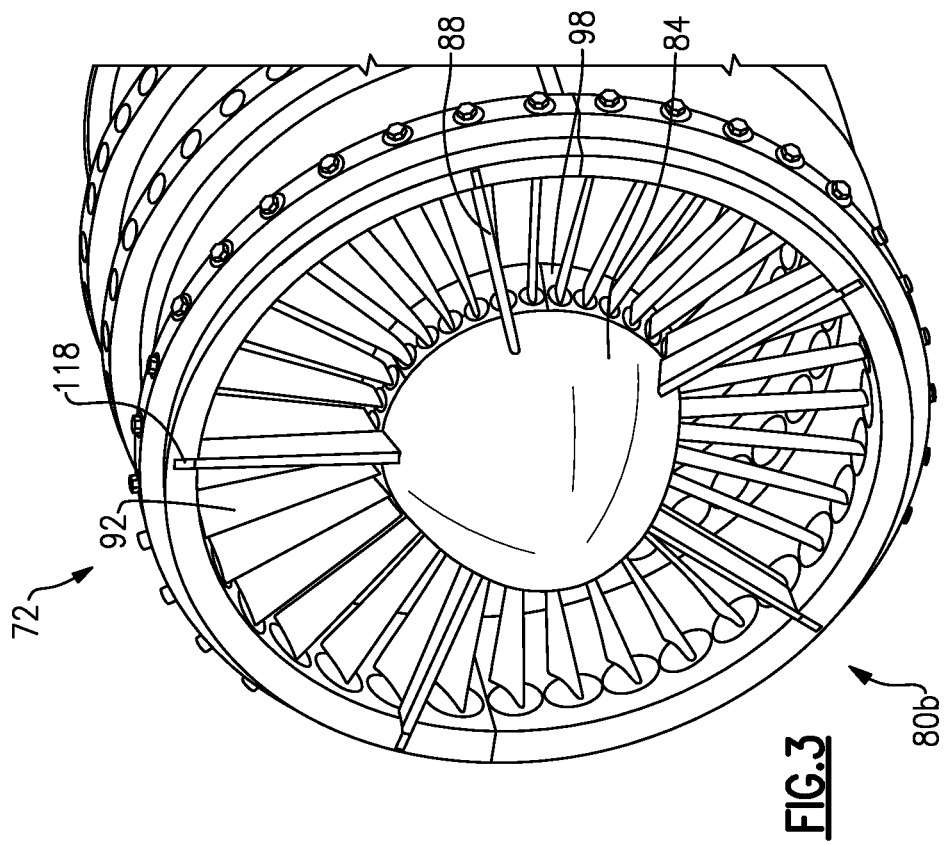
FIG. 3 is a perspective view of a low pressure compressor section of the example engine of FIG. 2.

Referring now to FIGS. 3 and 4, with continuing reference to FIGS. 1 and 2, the engine 20 includes a nosecone assembly 80a, and the engine 74 includes a nosecone assembly 80b. The assemblies 80a and 80b each include a nosecone 84 and nosecone supports, such as spars 88.

In the engine 20, the nosecone assembly 80a is positioned directly axially upstream from the fan 42. Upstream is determined with reference to the general direction of flow through the engine 20. The spars 88 of the nosecone assembly 80a extend radially outward from the nosecone 84 and are secured to a case of engine 20, such as a case 90 of the fan 42.

In the engine 74, the nosecone assembly 80b is positioned directly axially upstream from an array of inlet guide vanes 92. The spars 88 extend radially outward from the nosecone 84 and attach to an outer case 96 of a low pressure compressor section of the engine 74.

The inlet guide vanes 92 are adjustable in this example. Radially outer ends of the vanes 92 are attached to the outer case 96. Radially inner ends of the vanes 92 are attached to inner ring 98, which is made up of two pieces 98a and 98b in this example. The nosecone 84 can be used to limit axial movement of at least the piece 98a.

The spars 88 in both assemblies 80a and 80b extend radially across an annular flowpaths. In the engine 20, the spars 88 extend across a flowpath that delivers flow to the both the the bypass flowpath B and the core flowpath C. In the gas turbine engine 74, the spars 88 extend across a flowpath that delivers flow to the compressor section.

The example assemblies 80a and 80b include five circumferentially distributed spars 88. Other examples may include between five and twenty spars. Still other examples may include less than five or more than twenty spars. In the gas turbine engine 74, some or all of the spars 88 can be positioned to align circumferentially with a respective one of the inlet guide vanes 92.

The spars 88 can be used, exclusively, to support the nosecone 84. In some examples, the nosecone 84 is further supported by, or even attached to, the inner ring 98.

A bellmouth 100 extends axially forward from the outer case 96. The bellmouth 100 helps to direct flow into the engine 74. The bellmouth 100 is secured to the outer case 96. The bellmouth 100 and the outer case 96 are separate structures.

In some examples, a first end 110 of the spars 88 is directly attached to the nosecone 70 with mechanical fasteners. The spars 88 could also be integral with the nosecone 70. That is, the nosecone 70 and the spars 88 could be portions of a single unitized structure.

The spars 88 and the nosecone 70 can be cast or molded together as a single structure, for example.

An opposing, second end 114 of the spars 88 is can be bolted, or otherwise attached, to the case 96. The second end 114 may include a fastener tab 118 providing apertures that receive the bolt.

This support arrangement supports the nosecone 70 and keeps the nosecone 70 in place without adding extra complexity to a bellmouth or case of a compressor section.

Features of the disclosure includes supporting a nosecone directly using spars rather than exclusively through a radially inner ring.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

I claim:

1. A nosecone support of a gas turbine engine, comprising:
   a spar to extend radially from a nosecone with respect to an engine longitudinal axis, wherein the spar is configured to attach to a case to support the nosecone such that the spar is axially aligned with the nosecone and with the case relative to the engine longitudinal axis; and
   wherein the spar includes a first end directly secured to the nosecone and an opposing second end secured to a compressor case.

2. The nosecone support of claim 1, wherein the spar extends radially across a flowpath of a gas turbine engine.

3. The nosecone support of claim 1, include a fastener tab extending from the first end, the fastener tab for securement to an axially facing surface of the compressor case.

4. The nosecone support of claim 1, wherein the compressor case is a low pressure compressor case.

5. The nosecone support of claim 1, wherein the gas turbine engine is a land-based gas turbine engine.

6. The nosecone support of claim 1, wherein the spar is integral with the nosecone.

7. The nosecone support of claim 1, wherein the spar is configured to be positioned directly upstream an inlet guide vane of a compressor, and to be circumferentially aligned with the inlet guide vane.

8. The nose cone support of claim 1, wherein the spar is one of a plurality of spars, and the nosecone is supported exclusively by the plurality of spars.

9. A nosecone assembly, comprising:
   a nosecone extending along an engine longitudinal axis; and
   a plurality of spars extending radially directly from the nosecone with respect to the engine longitudinal axis, the plurality of spars configured to attach to a case of a gas turbine engine such that the plurality of spars are axially aligned with the nosecone and with the case relative to the engine longitudinal axis, wherein the case is a compressor case.

10. The nosecone assembly of claim 9, wherein the compressor case is a low pressure compressor case.

11. The nosecone assembly of claim 9, wherein the gas turbine engine is a land-based gas turbine engine.

12. The nosecone assembly of claim 11, wherein each spar of the plurality of spars includes a first end secured to the nosecone and an opposing second end secured to the case, and the compressor case is a low pressure compressor case of a compressor section.

13. The nosecone assembly of claim 12, wherein the plurality of spars are positioned directly upstream of a plurality of inlet guide vanes of the compressor section, the plurality of inlet guide vanes are adjustable, and each spar of the plurality of spars extends radially across a flowpath with respect to the engine longitudinal axis.

14. The nosecone assembly of claim 13, wherein at least some spars of the plurality of spars are circumferentially aligned with a respective vane of the plurality of inlet guide vanes with respect to the engine longitudinal axis, a radially inner end of the respective vane is attached to an inner ring including two pieces, the nosecone limits axial movement of at least one of the two pieces with respect to the engine longitudinal axis, and the plurality of spars are integral with the nosecone.

15. The nosecone assembly of claim 14, wherein:
   the compressor section includes a plurality of compressor blades driven by a turbine; and
   the two pieces of the inner ring are axially opposed to define a recess that receives the radially inner end of the respective vane, the recess extending radially inward from the flowpath towards the engine longitudinal axis.

16. The nosecone assembly of claim 13, wherein a bellmouth extends axially forward from the case with respect to the engine longitudinal axis, and the bellmouth defines a portion of the flowpath between an inner diameter of the bellmouth and an outer diameter of the nosecone.

17. The nosecone assembly of claim 16, wherein the bellmouth defines an engine inlet of the gas turbine engine that is dimensioned to deliver flow to the portion of the flowpath, and the bellmouth is separate and distinct from the compressor case.

18. The nosecone assembly of claim 9, wherein each spar of the plurality of spars extends radially across a flowpath of a gas turbine engine.

19. The nosecone assembly of claim 9, wherein each spar of the plurality of spars includes a first end for securing to the nosecone and an opposing second end for securement to the case.

20. The nosecone assembly of claim 9, wherein the nosecone and the plurality of spars form portions of a single unitized structure.

21. A method of supporting a nosecone, comprising:
 securing a plurality of spars to a case of a gas turbine engine, the plurality of spars extending radially from a nosecone with respect to an engine longitudinal axis such that the plurality of spars are axially aligned with the nosecone and with the case relative to the engine longitudinal axis, wherein the case is a compressor case.

22. The method of claim 21 including supporting the nosecone exclusively with the spars.

\* \* \* \* \*